United States Patent
Marrou et al.

(10) Patent No.: US 10,501,625 B2
(45) Date of Patent: Dec. 10, 2019

(54) METHODS OF MAKING ACRYLAMIDE-ACRYLIC ACID COPOLYMERS

(71) Applicant: Ecolab USA Inc., St. Paul, MN (US)

(72) Inventors: Stephen Marrou, Mount Prospect, IL (US); Xiangyang Zhu, Denver, CO (US); Heqing Huang, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/190,364

(22) Filed: Jun. 23, 2016

(65) Prior Publication Data
US 2016/0376390 A1 Dec. 29, 2016

Related U.S. Application Data

(60) Provisional application No. 62/186,100, filed on Jun. 29, 2015.

(51) Int. Cl.
*C08F 222/38* (2006.01)
*C08L 71/02* (2006.01)
*C08F 220/56* (2006.01)

(52) U.S. Cl.
CPC ............ *C08L 71/02* (2013.01); *C08F 220/56* (2013.01)

(58) Field of Classification Search
CPC .............................. C08F 222/38; C08L 71/02
See application file for complete search history.

(56) References Cited

U.S. PATENT DOCUMENTS

| | | | |
|---|---|---|---|
| 3,284,393 A * | 11/1966 | Vanderhoff | C08F 2/32 524/801 |
| 4,488,601 A | 12/1984 | Hammett | |
| 4,525,496 A | 6/1985 | Adaway et al. | |
| 5,065,822 A | 11/1991 | Miller et al. | |
| 5,079,278 A | 1/1992 | Mitchell | |
| 5,480,933 A | 1/1996 | Fox et al. | |
| 6,387,986 B1 | 5/2002 | Moradi-Araghi et al. | |
| 6,723,781 B1 | 4/2004 | Frat et al. | |
| 2006/0266488 A1* | 11/2006 | Doherty | D21H 21/10 162/164.1 |
| 2016/0032170 A1* | 2/2016 | Li | C09K 8/588 166/305.1 |

FOREIGN PATENT DOCUMENTS

| | | | |
|---|---|---|---|
| WO | 2011/112470 A2 | | 9/2011 |
| WO | 2011/113470 | * | 9/2011 |
| WO | 2011/113470 A1 | | 9/2011 |

OTHER PUBLICATIONS

Hassan, Saleh F. et al. "Study of Polyacrylamide/Cr (III) Hydrogels for Conformance Control in Injection Wells to Enhance Chemical Flooding Process." SPE International, 168069, May 2013, 11 pages.

Johnson, Stephen et al. "Effects of Divalent Cations, Seawater, and Formation Brine on Positively Charged Polyethylenimine/Destran Sulfate/Chromium(III) Polyelectrolyte Complexes and Partially Hydrolyzed Polyacrylamide/Chromium(III) Gelation." Journal of Applied Polymer Science, vol. 115, 2010, pp. 1008-1014.

Sigale, Karine et al. "Aspects of Crosslinking Sulfonated Polyacrylamides from Rheological Studies on Their Gels." Journal of Applied Polymer Science, vol. 64, 1997, pp. 1067-1072.

Bjørsvik, Magny et al. "Formation of colloidal dispersion gels from aqueous polyacrylamide solutions." Colloids and Surfaces A: Physicochem. Eng. Aspects, vol. 317, 2008, pp. 504-511.

Muruaga, E. et al. "Combining Bulk Gels and Colloidal Dispersion Gels for Improved Volumetric Sweep Efficiency in a Mature Waterflood." SPE International, 113334, Apr. 2008, 12 pages.

Wang, Wei et al. "Applications of Weak Gel for In-Depth Profile Modification and Oil Displacement." Journal of Canadian Petroleum Technology, vol. 42, No. 6, Jun. 2003. pp. 54-61.

Marudova-Zsivanovits, Mariya et al. "Rheological Investigation of Xanthan Gum-Chromium Gelation and Its Relation to Enhanced Oil Recovery." Journal of Applied Polymer Science, vol. 103, 2007, pp. 160-166.

Smith, J.E. "Performance of 18 Polymers in Aluminum Citrate Colloidal Dispersion Gels." SPE International, 28989, Feb. 1995, 10 pages.

Zhidong, Guo et al. "The Study of Oil Displacement Characteristics of CDG and Polymer Flooding." SPE International, 144119, Jul. 2011, 14 pages.

Chang, Harry L. et al. "Successful Field Pilot of In-Depth Colloidal Dispersion Gel (CDG) Technology in Daqing Oil Field." SPE International, 89460, Apr. 2004, 15 pages.

Ranganathan, Raja et al. "Experimental Study of the Gelation Behavior of a Polyacrylamide/Aluminum Citrate Colloidal-Dispersion Gel System." SPE Journal, Dec. 1998, pp. 337-343.

Al-Assi, A.A. et al. "Formation and Propagation of Gel Aggregates Using Partially Hydrolyzed Polyacrylamide and Aluminum Citrate." SPE Journal, Sep. 2009, pp. 450-461.

Riahinezahad, Marzieh et al. "Effect of Ionic Strength on the Reactivity Ratios of Acrylamide/Acrylic Acid (sodium acrylate) Copolymerization." Journal of Applied Polymer Science, vol. 131, No. 20, 2014, 7 pages.

Paril, Ahmet et al. "Composition Control Through pH and Ionic Strength During Acrylic Acid/Acrylamide Copolymerization." Journal of Applied Polymer Science, vol. 127, No. 5, 2012, 7 pages.

Riahinezahad, Marzieh et al. "Optimal Estimation of Reactivity Ratios for Acrylamide/Acrylic Acid Copolymerization." Journal of Polymer Science, vol. 51, No. 22, 2013, pp. 4819-4827.

(Continued)

*Primary Examiner* — Robert D Harlan
(74) *Attorney, Agent, or Firm* — Kagan Binder, PLLC

(57) ABSTRACT

A method of making acrylamide-acrylic acid copolymers in water-in-oil latices is described. The method results in a copolymer having randomly distributed carboxylate functionalities and is suitable for ionic crosslinking. The copolymers and their ionically crosslinked counterparts are useful for enhanced oil recovery processes.

19 Claims, No Drawings

(56) References Cited

OTHER PUBLICATIONS

Preusser, Calista et al. "An In-Situ NMR Study of Radical Copolymerization Kinetics of Acrylamide and Non-Ionized Acrylic Acid in Aqueous Solution." Macromol. Sympo., vol. 333, 2013, pp. 122-137.
Paril, A. et al. "Effect of Medium pH on the Reactivity Ratios in Acrylamide Acrylic Acid Copolymerization." Journal of Applied Polymer Science, vol. 103, No. 2. pp. 968-974.
Rintoul, Ignacio et al. "Polymerization of ionic monomers in polar solvents: kinetics and mechanism of the free radical copolymerization of acrylamide/acrylic acid." Polymer, vol. 46, No. 13, 2005, pp. 4525-5432.
Truong, N.D. et al. "Microstructure of acrylamide-acrylic acid copolymers: 2. as obtained by direct copolymerization." Polymer, vol. 27, No. 3, 1986, pp. 467-475.
Shawki, S.M. et al. "Estimation of the Reactivity Ratios in the Copolymerization of Acrylic Acid and Acrylamide from Composition-Conversion Measurements by an Improved Nonlinear Least-Squares Methods." Journal of Applied Polymer Science, vol. 23, No. 11, 1979, pp. 3155-3166.
Ponratnam, Surendra et al. "Reactivity Ratios of Ionizing Monomers in Aqueous Solution." Makromol. Chem. vol. 178, No. 4, 1977, pp. 1029-1038.
Rintoul et al., "Polymerization of ionic monomers in polar solvents: kinetics and mechanism of the free radical copolymerization of acrylamide/acrylic acid," Polymer 46, (2005) pp. 4525-4532.
International Search Report for International Application No. PCT/US16/38903, dated Sep. 6, 2016, 3 pages.
Written Opinion for International Application No. PCT/US16/38903, dated Sep. 6, 2016, 5 pages.
International Search Report for International Application No. PCT/US2016/038905, dated Sep. 11, 2016, 3 pages.
Written Opinion for International Application No. PCT/US2016/038905, dated Sep. 11, 2016, 5 pages.
Polymer Letters, "Representation of Composition and Blockiness of the Copolymer by a Triangular Coordinate System", vol. 1, pp. 359-363 (1963).
Halverson, et al., "Sequence Distribution of Carboxyl Groups in Hydrolyzed Polyacrylamide," Macromolecules 18(6), pp. 1139-1144 (1985).
R.A.M. Thomson, "A Kinetic Study of the Adiabatic Polymerization of Acrylamide," Journal of Chemical Education, vol. 63 No. 4, pp. 362-364 (1986).
Higuchi et al, Kinetic Aspects of the Alkaline Hydrolysis of Poly(acrylamide), Polymer Journal, vol. 3, No. 3, pp. 370-377, (1972).
European Search Report for European Application No. 16818492.7, dated Jan. 8, 2019, 5 pages.

* cited by examiner

METHODS OF MAKING ACRYLAMIDE-ACRYLIC ACID COPOLYMERS

TECHNICAL FIELD

The invention relates to methods of making copolymers of acrylamide and acrylic acid.

BACKGROUND

Polyacrylamide (PAM) and copolymers thereof with acrylic acid (PAMAA) are well known in the industry for a plethora of applications. Commercially important applications of these copolymers include their use as flocculants in water treatment or papermaking processes, as rheological additives for water or waterbased solutions in applications such as enhanced oil recovery (EOR), or as water absorptive agents when dried.

In dilute aqueous solutions, such as 1 wt % or less commonly employed in EOR applications, PAM and its copolymers are susceptible to chemical, thermal, and mechanical degradation. The conditions encountered in EOR applications can include one or more of high shear, harsh chemical environments, and temperatures of 70° C. and higher. Chemical degradation occurs when the amide moiety hydrolyzes at elevated temperature and/or pH, resulting in the evolution of ammonia and a residual carboxyl group. Thermal degradation of the vinyl backbone may occur through any one or more of several possible radical mechanisms. Mechanical degradation can also be an issue at the high shear rates experienced in the near-wellbore region, and within pumps and mixing devices designed to prepare the EOR solutions for injection into a reservoir.

Cross-linked variants of polyacrylamide have shown greater resistance to all of these methods of degradation, and have proved to provide viscosity stability in EOR applications. One commercially important type of crosslinked polymer used in EOR applications is PAMAA ionically crosslinked via interaction of the acrylic acid moieties with multivalent cations. Salts of $Ca^{2+}$, $Mg^{2+}$, $Zn^{2+}$, $Cr^{2+}$, $Cr^{3+}$, and $Al^{3+}$, for example, are employed commercially to form ionic crosslinks with the copolymers. In aqueous solutions, such polymers have increased viscosity compared to uncrosslinked polymers. Additionally, the crosslinks are capable of reforming after thermal or mechanical disruption during use. In such ionically crosslinked systems, it is desirable to employ a polymer having acrylic acid moieties arranged randomly throughout the copolymer, because this leads to maximum crosslink efficiency and the highest possible effective molecular weight of the crosslinked composition. As a practical matter, random acrylic acid placement in a copolymer leads to the observation that subsequent ionic crosslinking is efficient in raising the viscosity of aqueous solutions of the polymer; and a blockier copolymer requires more crosslinker to reach the same solution viscosity as a similar but more random copolymer.

In theory there are two ways to form poly(acrylamide-co-acrylic acid): by directly copolymerizing acrylamide and acrylic acid, or by partially hydrolyzing an acrylamide homopolymer. Direct copolymerization of acrylamide and acrylic acid (or the conjugate base thereof) leads to compositional drift of the produced copolymers due to the large reactivity ratio differences. Rintoul and Wandrey, *Polymer* 46 (2005), 4525-4532 have reported polymerization reactivity ratios for acrylamide and acrylic acid as a function of several different variables. Reproduced below is a table showing the pH dependence of reactivity ratios $r_1$ (acrylamide) and $r_2$ (acrylic acid) in copolymerization reactions carried out at a total monomer concentration of 0.4 mol/L in water at 40° C.

Reactivity ratios of AM ($r_1$) and AA ($r_2$) at different pHs. Reaction conditions: T=313 K, [AM]+[AA]=0.4 mol/1, $[K_2S_2O_8]=1.8\times10^{-2}$ mol/1. Source: Rintoul and Wandrey, *Polymer* 46 (2005), 4525-4532.

| | Reactivity ratios | |
|---|---|---|
| pH | r1 | r2 |
| 1.8 | 0.54 | 1.48 |
| 2.7 | 0.69 | 1.34 |
| 3.6 | 0.82 | 1.28 |
| 4.4 | 1.27 | 0.91 |
| 5.3 | 1.83 | 0.51 |
| 6.2 | 2.50 | 0.39 |
| 7.8 | 2.95 | 0.42 |
| 8.8 | 3.05 | 0.42 |
| 12 | 3.04 | 0.32 |

Commercially, preparation of PAMAA is often carried out by partial hydrolysis of PAM homopolymer. This technique has the advantage of providing randomly distributed carboxyl groups. Commercially, hydrolysis is carried out by synthesizing or dispersing a PAM homopolymer in water, adding a concentrated sodium hydroxide solution, and heating the mixture. However, as noted above hydrolysis of acrylamide functionality leads to evolution of ammonia ($NH_3$), and so special equipment is required to carry out the procedure.

Nonetheless, w/o latices are commercially significant sources of PAM and PAM copolymers for EOR applications due to their high solids content (up to 60 wt % polymer) combined with low viscosity and rapid inversion to use concentration, resulting in ease of use in the field. Due to the difficulty of post-emulsification, w/o latices of PAM or PAM copolymers are formed commercially by emulsifying the monomers and polymerizing in situ.

Thus, there is a need in the industry to provide w/o latices of PAMAA. There is a need in the industry to provide w/o latices of PAMAA using methods that do not result in evolution of $NH_3$. There is a need in the industry to provide ionically crosslinked PAMAA delivered from w/o latices. There is a need in the industry to provide ionically crosslinked PAMAA delivered from w/o latices wherein the amount of crosslinker required to reach a target viscosity upon inversion is about the same as the amount of crosslinker required to reach the same viscosity for a PAMAA copolymer formed via hydrolysis of PAM. There is a need in the industry to provide w/o latices of PAMAA that are easily formed using conventional equipment.

SUMMARY

Disclosed herein is a composition comprising a water-in-oil latex comprising a water phase and an oil phase, the water phase comprising water, acrylamide, and acrylic acid and having a pH of about 3 to 5, or about 3.5 to 4; wherein the latex further comprises a surfactant mixture consisting essentially of nonionic surfactants and comprising a block copolymer. In some embodiments, the water phase consists essentially of water, acrylamide, and acrylic acid, wherein the pH of the water phase is about 3 to 5. In some embodiments, the ratio of acrylamide to acrylic acid is about 50:50 to 99:1, for example 60:40 to 98:2. In some embodiments, the block copolymer is a triblock copolymer comprising at least one block consisting essentially of ethylene glycol repeat units and having an HLB of about 4 to 6. In some embodiments, the triblock copolymer further comprises at least one block consisting essentially of hydroxyacid repeat units. In some embodiments, the hydroxyacid is 12-hydroxystearic acid.

Also disclosed herein is a composition comprising a water-in-oil latex formed by a method comprising: combining water and monomers to form a water phase, the monomers comprising acrylamide and acrylic acid; adjusting the pH of the water phase to between about 3 and 5; combining a hydrocarbon solvent with a surfactant mixture to form an oil phase, the surfactant mixture consisting essentially of nonionic surfactants and comprising a block copolymer; contacting the water phase and the oil phase to form a water-in-oil latex; polymerizing the monomers to form a copolymer; and neutralizing the water phase. In some embodiments, the composition further comprises the product of diluting the composition with a water source after neutralizing, wherein the copolymer concentration after diluting is about 0.01 wt % to 1.00 wt %. In some embodiments, the water source comprises water and a salt of $Ca^{2+}$, $Mg^{2+}$, $Cr^{2+}$, $Cr^{3+}$, $Zn^{2+}$, or $Al^{3+}$, such as aluminum citrate or chromium acetate. In some embodiments, the ratio of acrylamide to acrylic acid units in the copolymer is about 50:50 to 99:1. In some embodiments, the neutralizing comprises contacting the composition with a neutralizing solution, the neutralizing solution comprising sodium hydroxide and an alkanolamide surfactant, such as N,N-diethanololeamide.

Also disclosed herein is a method of making a water-in-oil copolymer latex, the method comprising: combining water and monomers to form a water phase, the monomers comprising acrylamide and acrylic acid; adjusting the pH of the water phase to between about 3 and 5; combining a hydrocarbon solvent with a surfactant mixture to form an oil phase, the surfactant mixture consisting essentially of nonionic surfactants and comprising a block copolymer; contacting the water phase and the oil phase to form a water-in-oil latex; polymerizing the monomers to form a copolymer; and neutralizing the water phase. In some embodiments, the latex is diluted with a water source after neutralizing to form a dilute solution, wherein the copolymer concentration after diluting is about 0.01 wt % to 1.00 wt %. In some embodiments, the water source comprises water and a salt of $Ca^{2+}$, $Mg^{2+}$, $Cr^{2+}$, $Cr^{3+}$, $Zn^{2+}$, or $Al^{3+}$, such as aluminum citrate or chromium acetate. In some embodiments, the neutralizing comprises contacting the composition with a neutralizing solution, the neutralizing solution comprising sodium hydroxide and an alkanolamide surfactant such as N,N-diethanololeamide.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the scope of the invention. Reference to various embodiments does not limit the scope of the claims attached hereto. Additionally, any examples set forth in this specification are not intended to be limiting and merely set forth some of the many possible embodiments for the appended claims.

Definitions

The term "monomer" is used in context to mean either an unsaturated compound or the polymerized residue thereof. As used herein, "acrylic acid" means the unsaturated compound or the polymerized residue thereof bearing an acidic group having a pKa of about 5 or less or the conjugate base thereof.

As used herein, the term "solution" means a compound dissolved or dispersed in a liquid. A polymer solution is a polymer substantially dispersed or dissolved in water or a waterbased solution. The polymer dispersion is a dispersion as formed, or in the case of some EOR applications the dispersion before injection, during injection, or after injection as determined by context. Waterbased solutions include one or more dissolved salts, buffers, acids, bases, surfactants, or other dissolved, dispersed, or emulsified compounds, materials, components, or combinations thereof.

As used herein, the term "latex" refers to an emulsion or sol in which each colloidal particle contains one or more polymers, or to an emulsion or sol in which each colloidal particle contains one or more monomers that are capable of polymerization to form one or more polymers.

As used herein, the term "water" means a source of water comprising, consisting essentially of, or consisting of fresh water, deionized water, distilled water, produced water, municipal water, waste water such as runoff water or municipal waste water, well water, treated water, brackish water, or sea water, or a combination of two or more such water sources as determined by context. In some embodiments, the water source is at a temperature of about 20° C. to 90° C. In some embodiments, the water source has up to about 30 wt % total dissolved solids. The term "waterbased" means a composition including a water source listed herein.

As used herein, the term "stable" as applied to a water-in-oil latex means a kinetically stable latex that absent any force applied, temperature change, or chemical added to a latex, the latex is or is capable of being substantially free of coagulation, plating out, precipitation, gross coalescence of phases (conventionally referred to as "separation") or any other evidence of instability conventionally associated with water-in-oil latices for at least about 24 hours at about 20° C. As used herein, the term "shelf stable" means stable for at least six months at 20° C. or a selected temperature or range thereof.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

DISCUSSION

We have found that PAMAA polymers are suitably formed by copolymerization of acrylamide (AM) and acrylic acid (AA) in w/o latices that are stable at pH of about 3.0 to 5.0. The latices are stable over this range of pH, and acrylamide is stable to hydrolysis over this range as well. The copolymers formed using this method are of similar molecular weight to PAM homopolymers polymerized in w/o latices. The copolymers formed readily undergo ionic crosslinking with salts of multivalent cations, wherein the amount of crosslinker required to reach a target viscosity upon inversion (dilution and concomitant destabilization of the latex) is about the same as the amount required to reach the same viscosity for a PAMAA formed via hydrolysis of PAM.

Water-in-Oil Latex Polymerization

Water-in-oil (w/o) latices including monomers comprising, consisting essentially of, or consisting of acrylamide (AM) and acrylic acid (AA) are the starting point for polymerization to form PAMAA copolymers. The latices are stable during polymerization, subsequent neutralization, and storage of the neutralized latices. The copolymers thus formed have properties similar to or the same as hydrolyzed PAM (HPAM) of similar or the same molecular weight.

To carry out copolymer synthesis, a copolymerization w/o latex is formed that comprises, consists essentially of, or consists of an oil phase and a water phase.

In some embodiments, the water phase comprises, consists essentially of, or consists of a blend of AM and AA in water. In various embodiments, the water phase is about 40 wt % to 90 wt % of the total weight of the w/o latex, or about 45 wt % to 90 wt %, or about 50 wt % to 90 wt %, or about 55 wt % to 90 wt %, or about 60 wt % to 90 wt %, or about 40 wt % to 85 wt %, or about 40 wt % to 80 wt %, or about 40 wt % to 75 wt %, or about 40 wt % to 70 wt %, or about 50 wt % to 80 wt %, or about 55 wt % to 75 wt % of the total weight of the w/o latex. In some embodiments, the monomer concentration in the water phase is about 50 wt % to 95 wt % of the total weight of the water phase, or about 55 wt % to 95 wt %, or about 60 wt % to 95 wt %, or about 65 wt % to 95 wt %, or about 70 wt % to 95 wt %, or about 50 wt % to 90 wt %, or about 50 wt % to 85 wt %, or about 50 wt % to 80 wt %, or about 50 wt % to 75 wt %, or about 60 wt % to 90 wt %, or about 60 wt % to 85 wt %, or about 60 wt % to 80 wt % of the total weight of the water phase of the w/o latex. In some embodiments, the molar ratio of AM:AA in the water phase is about 50:50 to 99:1, or about 55:45 to 99:1, or about 60:40 to 99:1, or about 65:35 to 99:1, or about 70:30 to 99:1, or about 50:50 to 98:2, or about 50:50 to 97:3, or about 50:50 to 96:4, or about 50:50 to 95:5, or about 50:50 to 90:10, or about 50:50 to 85:15, or about 50:50 to 80:20, or about 60:40 to 70:30, or about 60:40 to 95:5, or about 60:40 to 97:3, or about 70:30 to 95:5, or about 70:30 to 97:3.

In some embodiments, AM and AA make up substantially the entire monomer complement in the w/o latex. In other embodiments, up to 1 wt % of one or more additional monomer(s) are suitably included in the w/o latex, based on the total weight of monomer included in the latex. For example about 0.001 wt % to 1.00 wt %, or about 0.01 wt % to 1.00 wt %, or about 0.1 wt % to 1.00 wt %, or about 0.2 wt % to 1.00 wt %, or about 0.3 wt % to 1.00 wt %, or about 0.4 wt % to 1.00 wt %, or about 0.5 wt % to 1.00 wt %, or about 0.6 wt % to 1.00 wt %, or about 0.7 wt % to 1.00 wt %, or about 0.8 wt % to 1.00 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.1 wt % to 0.5 wt % of one or more additional monomer(s) are suitably included in the w/o latex, based on the total weight of monomer included in the latex. In some embodiments, a useful additional monomer includes a long-chain hydrocarbyl functionality intended to produce physical or associative crosslinking in a waterbased polymer solution. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, a useful additional monomer is 2-acrylamido-2-methylpropane sulfonic acid or the conjugate base thereof. Other monomers are also usefully incorporated at amounts of up to 1 wt % of the total monomer composition in the w/o latex.

The water phase of the w/o latex is formed by dissolving the monomers in water, then adjusting the pH of the water phase prior to adding additional latex components. The pH of the water phase is advantageously adjusted to be about 2.0 to 5.0, or about 2.2 to 5.0, or about 2.4 to 5.0, or about 2.6 to 5.0, or about 2.8 to 5.0, or about 3.0 to 5.0, or about 3.2 to 5.0, or about 3.4 to 5.0, or about 3.6 to 5.0, or about 3.8 to 5.0, or about 2.0 to 4.8, or about 2.0 to 4.6, or about 2.0 to 4.4, or about 2.0 to 4.2, or about 2.0 to 4.0, or about 3.0 to 4.5, or about 3.5 to 4.5, or about 3.7 to 4.3, or about 3.7 to 4.0. Compounds suitably added to the water phase to reduce pH include protic acids capable of providing the target pH and is unreactive otherwise in the w/o latex. Suitable protic acids include organic acids such as hydrocarbyl functional carboxylic and sulfonic acids, and inorganic acids. While many protic acids are useful in forming a low pH water phase, acids known to ionize 100% in water are preferable from an efficiency standpoint, since less is required to reach the target pH. Examples of suitable protic acids include hydrochloric acid, hydroiodic acid, hydrobromic acid, perchloric acid, nitric acid, and sulfuric acid. Other compounds suitably added to the water phase to increase pH to the target value include sodium hydroxide or other monovalent metal hydroxides. The compounds added to the water phase to reduce or increase pH are suitably added neat or in a waterbased solution, for example a 20 wt % to 50 wt % solution of the compound in a water source.

One or more additional agents are suitably added to the water phase, during or after formation thereof. Buffers, salts, chain transfer agents, and chelators are examples of additional agents suitably added to the water phase. Such agents are added at suggested use levels or at levels determined by the target water source to be used to dilute the latices to their final concentration in the field. Suitable chain transfer agents include but are not limited to water soluble compounds such as sodium hypophosphite. Suitable chelators include but are not limited to tetrasodium ethylenediaminetetraacetic acid (EDTA).

The oil phase of the w/o latex is formed separately for addition to the water phase. The oil phase includes a hydrocarbon solvent and one or more surfactants. In embodiments, the hydrocarbon surfactant is present in the oil phase at about 60 wt % to 99 wt % of the total weight of the oil phase, or about 65 wt % to 99 wt %, or about 70 wt % to 99 wt %, or about 75 wt % to 99 wt %, or about 80 wt % to 99 wt %, or about 85 wt % to 99 wt %, or about 90 wt % to 99 wt %, or about 95 wt % to 99 wt %, or about 97 wt % to 99 wt %, or about 60 wt % to 98 wt %, or about 60 wt % to 97 wt %, or about 60 wt % to 96 wt %, or about 60 wt % to 95 wt %, or about 80 wt % to 98 wt %, or about 85 wt % to 98 wt %, or about 90 wt % to 98 wt %, or about 90 wt % to 97 wt %, or about 90 wt % to 96 wt %, or about 90 wt % to 95 wt % of the total weight of the oil phase. The hydrocarbon solvent is any compound or blend of compounds that is liquid at 20° C. or lower includes substantially only hydrogen and carbon. Generally, hydrocarbons having between 4 and 20 carbons are useful as the hydrocarbon solvent or in a blend of compounds that together form the hydrocarbon solvent for the oil phase. Aromatic, aliphatic, and aralkyl compounds such as linear, branched or cyclic alkanes, alkenes, alkynes, aralkyl compounds, and the like are suitably employed in the oil phase. Paraffin oils or solvents, which are blends of petroleum distillates having a stated boiling range, are examples of useful solvents for the oil phase. Suitable solvents include but are not limited to dearomatized kerosene fractions such as KETRUL® D80, sold by Total S.A. of Houston, Tex. In some embodiments, the solvent is not flammable at temperatures of about 50° C. to 90° C.

In some embodiments, the oil phase comprises, consists essentially of, or consists of the hydrocarbon solvent(s) and one or more surfactants. In embodiments, the surfactant employed in the oil phase comprises, consists essentially of, or consists of a surfactant blend of two or more surfactants, or three or more surfactants. In embodiments, the surfactant or surfactant blend comprises, consists essentially of, or consists of one or more nonionic surfactants. Examples of useful nonionic surfactants include those having linear ethylene glycol, propylene glycol, or both glycol units in a short (2-20 repeat units) chain bonded to a linear, branched, cyclic, alicyclic, aromatic, or alkaryl hydrocarbon group via an ether, ester, or amide linkage. In some embodiments, one or more moieties derived from a sugar molecule are present in the nonionic surfactant. Examples of useful nonionic surfactants include those having 4-10 ethoxylate groups bonded to a sorbitol moiety which in turn is bonded to a fatty acid, such as ethoxylated sorbitan monooleate and ethoxylated sorbitan monostearate. Other useful nonionic surfactants include a linear, branched, cyclic, alicyclic, aromatic, or alkaryl hydrocarbon group bonded to one or more moieties derived from a sugar molecule; examples include sorbitan monostearate, sorbitan monooleate, and sorbitan monoisostearate.

In some embodiments, the surfactant or surfactant blend comprises, consists essentially of, or consists of a polymeric nonionic surfactant. In some such embodiments, the polymeric nonionic surfactant comprises, consists essentially of, or consists of a poly(ethylene glycol) ester of a fatty acid or a long-chain hydrocarbon acid having about 10 to 30, or about 12 to 26, or about 12 to 20, or about 14 to 20, or about 16 to 20 carbons. In some embodiments, the polymeric nonionic surfactant is branched. In some embodiments the polymeric nonionic surfactant is hyperbranched. In some embodiments, the branched or hyperbranched polymeric nonionic surfactant comprises, consists essentially of, or consists of one or more poly(ethylene glycol) branches and one or more fatty acid or long-chain hydrocarbon branches.

In some embodiments, the polymeric nonionic surfactant is a block copolymer. Block copolymers include those having one or more hydrophilic or water-soluble blocks and one or more hydrophobic or oil-soluble blocks, with the proviso that there is at least two hydrophilic blocks or two hydrophobic blocks. In some embodiments, the block copolymer includes one or more ester linkages between one or more blocks. Block copolymers wherein A is hydrophilic block and B is a hydrophobic block are usefully employed where linear triblock ABA or BAB, tetrablock ABAB, pentablock ABABA or BABAB, or higher order structures are employed. In some embodiments, the block copolymer is also branched or hyperbranched, with branches formed from one or more A blocks, B blocks, or both. In some embodiments, three or more different block structures (thus, polymers including one or more A, B, and C blocks for example) are employed in conjunction with the overall block copolymer structures described above. In some embodiments, one or more blocks are branched structures. In some embodiments, one or more hydrophilic (A) blocks comprise, consist essentially of, or consist of about 2 to 100 ethylene oxide repeat units, or about 4 to 50, 2 to 50, 2 to 40, or 4 to 40 ethylene oxide repeat units. In some embodiments, one or more hydrophobic (B) blocks comprise, consist essentially of, or consist of repeat units derived from the condensation of one or more hydroxyacids, wherein the hydroxyacids include a linear, branched, cyclic, or alicyclic hydrocarbon moiety having about 10 to 30 carbons. In some such embodiments, the hydroxyacid is 12-hydroxystearic acid (12-hydroxyoctadecanoic acid). In some embodiments, the block copolymer has an HLB (hydrophilic-lipophilic balance) of about 4 to 6, or about 4.5 to 6, or about 4.5 to 5.5, or about 4.6 to 5.4, or about 4.7 to 5.3, or about 4.8 to 5.2.

Useful block copolymer surfactants include those manufactured by Croda International PLC of Yorkshire, United Kingdom under the trade name HYPERMER®. One example of a useful surfactant is HYPERMER® 2524. In some embodiments, the surfactant is a blend of one or more block copolymers and one or more conventional nonionic surfactant(s). Conventional nonionic surfactants include the non-polymeric surfactants listed above. In some such embodiments, the weight ratio of the block copolymer surfactant to conventional nonionic surfactant employed in the oil phase is about 1:10 to 20:1, or about 1:5 to 20:1, or about 1:2 to 20:1, or about 1:1 to 20:1, or about 1:10 to 18:1, or about 1:10 to 16:1, or about 1:10 to 14:1, or about 1:10 to 12:1, or about 1:10 to 10:1, or about 1:10 to 8:1, or about 1:10 to 6:1, or about 1:10 to 4:1, or about 1:1 to 10:1, or about 1:1 to 8:1, or about 1:1 to 6:1, or about 2:1 to 10:1, or about 2:1 to 8:1, or about 2:1 to 6:1. In some embodiments, the total amount of surfactant (including surfactant blends) in the oil phase is about 0.1 wt % to 10 wt % based on the total weight of the oil phase, or about 0.5 wt % to 10.0 wt %, or about 1.0 wt % to 10.0 wt %, or about 2.0 wt % to 10.0 wt %, or about 3.0 wt % to 10.0 wt %, or about 4.0 wt % to 10.0 wt %, or about 5.0% wt % to 10.0 wt %, or about 6.0 wt % to 10.0 wt %, or about 7.0 wt % to 10.0 wt %, or about 0.1 wt % to 9.9 wt %, or about 0.1 wt % to 9.7 wt %, or about 0.1 wt % to 9.5 wt %, or about 0.1 wt % to 9.0 wt %, or about 0.1 wt % to 8.5 wt %, or about 0.1 wt % to 8.0 wt %, or about 5.0 wt % to 9.5 wt %, or about 7.0 wt % to 9.5 wt %, or about 7.0 wt % to 9.0 wt % of the total weight of the oil phase.

The surfactant or surfactant blend is added to the hydrocarbon solvent with agitation, either neat or in a concentrated solution in the hydrocarbon solvent to be employed in the w/o latex. In some embodiments, the combination of hydrocarbon solvent and surfactant or surfactant blend is heated to dissolve the surfactant. In some such embodiments, the combination is heated to about 30° C. to 60° C. until the surfactant(s) dissolve. A surfactant blend is added by sequentially adding each surfactant to the hydrocarbon solvent or as a formed mixture, depending on convenience of the user and equipment employed to mix the components.

After the water phase and the oil phase are independently formed, the two liquid phases are blended together to form a stable w/o latex. In some embodiments, blending is accomplished by adding the oil phase to the water phase, typically slowly or in aliquots and with efficient mixing using conventional equipment to result in a stable latex. In embodiments, the weight ratio of the water phase:oil phase in the latex after mixing is complete is about 5:1 to 1:1, or about 4.5:1 to 1:1, or about 4.0:1 to 1:1, or about 3.5:1 to 1:1, or about 3.0:1 to 1:1, or about 2.5:1 to 1:1, or about 2:1 to 1:1, or about 5:1 to 1.5:1, or about 5:1 to 2.0:1, or about 5:1 to 2.5:1, or about 5:1 to 3:1, or about 4:1 to 1.5:1, or about 3:1 to 1.5:1, or about 2.5:1 to 1:5:1.

After the stable w/o latex is formed, polymerization is initiated. One of skill will recognize that the polymerization step is generally carried out according to conventional water-in-oil polymerization procedures and using standard free-radical initiators such as any of those found in the art that are at least partially soluble in the water phase. While not limited thereto, free radical and redox type chain reaction methodologies are advantageously employed in some embodiments due to the known cost efficiency and ability to form very high molecular weight species associated with such techniques.

Thermally induced free radical polymerization is suitably initiated by adding a compound that decomposes homolytically at a known temperature to result in a free radical, which then proceeds to react with the unsaturated site of a monomer and initiate polymerization. Non-limiting examples of thermal free radical initiators include inorganic peroxides such as potassium persulfate. Redox polymerization is an alternative technique employing a single electron transfer reaction that has found wide application for initiating w/o latex polymerizations. Redox reactions are incurred by reduction of e.g. hydrogen peroxide or an alkyl hydrogen peroxide by $Fe^{2+}$, $Cr^{2+}$, $Cr^{3+}$, $V^{2+}$, $Ti^{3+}$, $Co^{2+}$, or $Cu^{2+}$ salts.

Examples of suitable redox systems include t-butylhydroperoxide/ferrous ion; ammonium persulfate/sodium bisulfite; and t-butylhydroperoxide/sodium metabisulfite. Typically, the initiator(s) are dissolved in water and added to the w/o latex at elevated temperature to initiate the polymerization The polymerization reaction is carried out in the latex for a sufficient amount of time to reach PAMAA weight-average molecular weights ($M_w$) of at least about 100,000 g/mol. The threshold molecular weight provides sufficient chain length to impart a desirable increase in viscosity when the polymer is diluted for use in one or more EOR applications. In embodiments, the $M_w$ of the polymer compositions is about 100,000 to 10,000,000 g/mol, or about 500,000 to 8,000,000 g/mol, or about 500,000 to 5,000,000 g/mol, or about 1,000,000 to 5,000,000 g/mol. After polymerization is complete, the w/o latex remains stable.

After the polymerization is complete, the PAMAA copolymers in the w/o latices include about 50 mol % to 99 mol % AM, or about 55 mol % to 99 mol % AM, or about 60 mol % to 99 mol % AM, or about 65 mol % to 99 mol % AM, or about 70 mol % to 99 mol % AM, or about 50 mol % to 95 mol % AM, or about 50 mol % to 90 mol % AM, or about 50 mol % to 85 mol % AM, or about 50 mol % to 80 mol % AM, or about 50 mol % to 75 mol % AM, or about 50 mol % to 70 mol % AM, or about 55 mol % to 80 mol % AM, or about 60 mol % to 75 mol % AM, or about 65 mol % to 75 mol % AM. In some embodiments, the remaining component comprises, consists essentially of, or consists of acrylic acid. In other embodiments, up to 1 wt % of the total monomer mix, or the total copolymer composition, includes a third monomer.

Post-Treatment of the Water-in-Oil Latices

After completion of polymerization the stable w/o latex is neutralized to a pH of about 5 to 7, such as about 6 to 7, by adding a base such as sodium hydroxide to the latex to result in a stable neutralized w/o latex. In some embodiments, the base is dissolved in water prior to addition. In some embodiments, a stabilizing surfactant is added to the base in water to form a neutralization solution; the neutralization solution is added to the w/o latex to form a stable neutralized w/o latex. The neutralization solution is added dropwise, batchwise or in a single addition to the w/o latex to form a neutralized latex. In some embodiments, a solution of about 25 wt % to 50 wt % sodium hydroxide or other monovalent metal hydroxide is formed, and a stabilizing surfactant is added to the solution at about 5 wt % to 10 wt % of the total weight of the neutralization solution. In other embodiments, a stabilizing surfactant is added to the w/o latex, followed by addition of the base in water to form a neutralized w/o latex.

The stabilizing surfactant comprises, consists essentially of, or consists of a nonionic surfactant or blend of two or more nonionic surfactants having an HLB of about 2 to 15, or about 3 to 15, or about 4 to 15, or about 5 to 15, or about 2 to 14, or about 2 to 13, or about 2 to 12, or about 2 to 11, or about 2 to 10, or about 2 to 9, or about 2 to 8, or about 2 to 7, or about 2 to 6, or about 3 to 14, or about 3 to 12, or about 3 to 10, or about 3 to 8, or about 3 to 6, or about 4 to 14, or about 4 to 12, or about 4 to 10, or about 4 to 8, or about 4 to 6. In some embodiments, the stabilizing surfactant includes amide, amine, triglyceride, or ether functionality. In some embodiments, the stabilizing surfactant is a block copolymer including alkylene oxide functionality, such as ethylene oxide or propylene oxide or both. In some embodiments, the surfactant includes one or more amine, amide, ether, or triglyceride functionality. In some embodiments, the stabilizing surfactant is an amide. In some such embodiments, the stabilizing surfactant comprises, consists essentially of, or consists of an N,N-dialkanolamide, such as an N,N-diethanolamide, having a hydrocarbon moiety of about 12 to 30 carbons. Examples of useful N,N-dialkanolamide surfactants include those sold under the trade name AMI-DEX® by the Lubrizol Corporation of Wickliffe, Ohio; examples include N,N-diethanololeamide (AMIDEX® O) and N,N-diethanolcocamide (AMIDEX® CE).

The neutralization solution is added to the w/o latex in an amount that results in a pH of about 5 to 8, or about 6 to 7, further wherein the amount of the stabilization surfactant added to the latex is about 1 wt % or less of the total weight of the neutralized latex, for example about 0.1 wt % to 1.0 wt %, or about 0.2 wt % to 1.0 wt %, or about 0.3 wt % to 1.0 wt %, or about 0.4 wt % to 1.0 wt %, or about 0.5 wt % to 1.0 wt %, or about 0.6 wt % to 1.0 wt %, or about 0.1 wt % to 0.9 wt %, or about 0.1 wt % to 0.8 wt %, or about 0.1 wt % to 0.7 wt %, or about 0.1 wt % to 0.6 wt %, or about 0.2 wt % to 0.9 wt %, or about 0.4 wt % to 0.8 wt %, or about 0.4 wt % to 0.7 wt %, or about 0.5 wt % to 0.7 wt % of the total weight of the neutralized latex.

Neutralization results in a stable neutralized w/o latex having a PAMAA copolymer dispersed therein. The neutralized polymer is crosslinkable using a multivalent metal cation as described above. We have found that the neutralized latices include a complement of carboxylate groups corresponding to the amount of acrylic acid originally added to the water phase prior to polymerization. That is, the conditions during the copolymerization and neutralization are sufficiently mild such that no hydrolysis of acrylamide amide groups to carboxylate groups is observed.

The PAMAA copolymers formed readily undergo ionic crosslinking with salts of multivalent cations, wherein the amount of crosslinker required to reach a target viscosity upon inversion (dilution and concomitant destabilization of the latex) is about the same as the amount required to reach the same viscosity for a PAMAA formed via hydrolysis of PAM. Thus, in embodiments, one or more ionic crosslinking agents are added to the w/o latex or the neutralized w/o latex to form a crosslinked PAMAA copolymer. In some embodiments, ionic crosslinking of the PAMAA copolymers is carried out by contacting the neutralized w/o latex with an ionic crosslinking agent, which is a salt bearing a divalent or multivalent cation. In some embodiments the salt is added directly to the neutralized latex while in other embodiments the salt is dissolved in water before adding to the neutralized latex. In some embodiments, the salt is added contemporaneously with dilution and inversion of the neutralized latex in the field as the polymer is prepared for injection into a reservoir. In still other embodiments, the salt is added prior to or contemporaneously with the base used to neutralize the w/o latex.

Suitable ionic crosslinking agents include salts of multivalent cations including but not limited to $Ca^{2+}$, $Mg^{2+}$, $Zn^{2+}$, $Cr^{2+}$, $Cr^{3+}$, and $Al^{3+}$. While the counterion employed in conjunction with the multivalent cations is not particularly limited, in some embodiments organic counterions are usefully employed. Examples of suitable organic counterions include acetate, lactate, oxalate, maleate, succinate, glutarate, and citrate. Examples of suitable inorganic counterions include phosphonate, sulfonate, carbonate, halide such as chloride or bromide, and the like. Thus, for example, a solution of calcium oxalate, zinc chloride, magnesium acetate, or aluminum citrate in water is contacted with a neutralized w/o latex, before or during inversion, to result in a crosslinked PAMAA copolymer. It is a feature of the invention that crosslinking results in a polymer solution viscosity commensurate with the results obtained by crosslinking a hydrolyzed PAM homopolymer of the same or similar molecular weight and molecular weight distribution. Without being limited by theory, we believe that the randomized copolymerization enabled at the target pH results in a distribution of carboxylate moieties that is the same as or similar to the distribution of carboxylate moieties obtained by hydrolysis of a PAM homopolymer. This randomized distribution, in turn, results in maximum crosslinking efficiency and thus maximum viscosification at the selected level of crosslinking.

In embodiments, the amount of ionic crosslinker is selected to provide a target viscosity of the PAMAA copolymer when diluted to a target polymer flooding concentration. The target polymer flooding concentration is about 1 wt % or less of PAMAA in water, for example about 0.01 wt % to 1.00 wt %, or about 0.02 wt % to 1.00 wt %, or about 0.03 wt % to 1.00 wt %, or about 0.04 wt % to 1.00 wt %, or about 0.05 wt % to 1.00 wt %, or about 0.06 wt % to 1.00 wt %, or about 0.07 wt % to 1.00 wt %, or about 0.08 wt % to 1.00 wt %, or about 0.09 wt % to 1.00 wt %, or about 0.10 wt % to 1.00 wt %, or about 0.01 wt % to 0.90 wt %, or about 0.01 wt % to 0.80 wt %, or about 0.01 wt % to 0.70 wt %, or about 0.01 wt % to 0.60 wt %, or about 0.01 wt % to 0.50 wt %, or about 0.01 wt % to 0.40 wt %, or about 0.01 wt % to 0.30 wt %, or about 0.01 wt % to 0.20 wt %, or about 0.01 wt % to 0.10 wt %, or about 0.02 wt % to 0.50 wt %, or about 0.03 wt % to 0.50 wt %, or about 0.02 wt % to 0.30 wt % PAMAA in water. The target viscosity is selected by determining the viscosity of the petroleum product in the reservoir, wherein the target viscosity that is the same or similar to the viscosity of the petroleum product. Thus, the concentration, degree of crosslinking, molecular weight of the PAMAA copolymer, and the like in turn dictate the ideal concentration of PAMAA copolymer in the polymer flooding solution.

In some embodiments, the amount of ionic crosslinker is selected to be about 1 wt % to 10 wt % based on the weight of the PAMAA copolymer. Thus, in various embodiments, the polymer flooding solution includes about 500 ppm (0.05 wt %) PAMAA and about 5 to 50 ppm ionic crosslinker; or about 1000 ppm (0.10 wt %) PAMAA and about 10 to 100 ppm ionic crosslinker. Upon contacting PAMAA with an ionic crosslinker, full crosslinking and thus peak solution viscosity of the polymer flooding solutions is reached in about 1 hour to 10 days; the amount of time to reach peak viscosity will depend on the processing methodology, temperature, and polymer concentration during inversion and/or crosslinking.

The peak viscosity of the polymer flooding solution after contacting with ionic crosslinker is at least about 2 times (twice or 2×) the viscosity of the same polymer flooding solution without addition of the ionic crosslinker, for example about 2× to 500×, or about 5× to 500×, or about 10× to 500×, or about 2× to 400×, or about 2× to 300×, or about 2× to 200×, or about 2× to 100×, or about 2× to 50×, or about 10× to 300×, or about 10× to 100×, or about 10× to 50× the viscosity of the same polymer flooding solution without addition of the crosslinker. One of skill will appreciate that viscosity increase depends on the amount of polymer, amount of acrylic acid in the copolymer, type and amount of crosslinker employed, and other factors such as temperature and type and amount of solids dissolved in the water source used to form the polymer flooding solution.

Inversion of the Water-in-Oil Latices

The neutralized w/o latices are advantageously used in one or more polymer flooding (EOR) applications, where they are inverted to provide a polymer flooding solution having about 1 wt % polymer or less. In some embodiments, inversion is accomplished by adding a water source to the neutralized latex so as to decrease the polymer concentration and incur hydration of the polymer chains. In other embodiments, an inverting surfactant is further added to the latices to stabilize the latex components during the inversion in order to avoid coagulation or precipitation of the polymer. Dilution eventually destabilizes the latex structure, giving rise to disruption of the latex; this is the process commonly referred to as inversion. One of skill will appreciate that the neutralized w/o latices formed using the methods of the invention can be inverted employing standard inversion materials and techniques: no special steps or devices are required.

Inversion of the neutralized w/o latex results in a polymer flooding composition. In some embodiments, the polymer flooding composition is formed in the field, wherein the neutralized w/o latex is delivered as the starting material for an EOR process and one or more water sources are present to accomplish the inversion. In some embodiments, one or more additional surfactants or inversion aids such as glycerol are added to the water source to facilitate the transition of the latex to a dilute polymer solution. In some embodiments, an ionic crosslinker as described above is added to the water source used to invert the neutralized w/o latex. In such embodiments, the ionic crosslinking compounds and methods described above are similarly applied except that the crosslinking compounds are first dissolved in the water source to be used for inversion. In such embodiments, inversion of the neutralized w/o latices contemporaneously results in inversion and ionic crosslinking of the PAMAA copolymer.

In some embodiments, the polymer flooding composition comprises, consists essentially of, or consists of a combination of the inverted, neutralized, ionically crosslinked PAMAA copolymer with a water source and optionally one or more inverting surfactants. In some embodiments, the polymer flooding composition is a combination of the inverted, neutralized w/o latex with a water source and optionally one or more inverting surfactants. In some embodiments, the water source comprises, consists essentially of, or consists of fresh water, deionized water, distilled water, produced water, municipal water, waste water such as runoff water or municipal waste water, well water, treated water, brackish water, or sea water, or a combination of two or more such water sources. In some embodiments, the water source is contacted with the neutralized w/o latex at a temperature of about 20° C. to 90° C., or about 50° C. to 90° C. to accomplish the inversion.

It is a feature of the invention that the ionically crosslinked w/o latices result in polymer flooding solutions having viscosities that are commensurate with those obtained by conventional base catalyzed hydrolysis of PAM homopolymers followed by ionic crosslinking. That is, dissolving a similar molecular weight PAM homopolymer in water, hydrolyzing it to a target mole % carboxylate content that is commensurate with the AA content of the PAMAA polymer synthesized according to the methods of the invention, and ionically crosslinking the polymer yields a solution of the same, substantially the same, or similar viscosity of the PAMAA copolymers synthesized and inverted using the methods described herein.

EXPERIMENTAL

Example 1

A water-in-oil latex was formed using the components shown in Table 1.

TABLE 1

Components of a w/o latex polymerization of AM and AA.

| Composition | Material | Wt % |
|---|---|---|
| Oil Phase | KETRUL ® D80 (TOTAL Special Fluids of Casablanca, Morocco) | 25.72 |
|  | Sorbitan monooleate | 0.31 |
|  | POE (4) Sorbitan monostearate (Polysorbate 61) | 1.24 |
|  | Tween 61 | 0.67 |
| Water Phase | Acrylamide (50.24% in water) | 38.95 |
|  | Acrylic Acid | 8.23 |
|  | DI Water | 12.43 |
|  | Sodium chloride | 2.07 |
|  | Sodium hypophosphite | 0.002 |
|  | Sodium hydroxide | 0.835 |
|  | EDTA | 0.0092 |
| Initiators | Sodium metabisulfite | 0.018 |
|  | t-Butyl hydroperoxide | 0.13 |
| Post-Polymerization Additives | N,N-diethanololeamide | 0.62 |
|  | Sodium hydroxide | 8.27 |
|  | Ammonium thiocyanate | 0.52 |

A latex was formed by mixing the components of the water phase and oil phase separately, then combining them in a reaction vessel with vigorous stirring using an overhead paddle blade mixer followed by sparging of the latex with nitrogen. The pH of the water phase was measured to be 3.7. After mixing was complete, the initiator composition was added to the vessel and the vessel was sealed. The contents of the vessel were heated to 40° C. with stirring for about 4 hours. Then the post-treatment composition was mixed and added to the vessel. Then the neutralization composition was mixed and added to the vessel. The resulting neutralized w/o latex was stable after cooling to ambient laboratory temperature and showed no sign of destabilization (separation, coagulum formation) during the procedure. The reduced specific viscosity (RSV) of the latex is 36 dL/g, as measured at 450 ppm polymer concentration in 1M sodium nitrate solution using an Ubbelohde semimicro dilution viscometer, size 75, held at 30° C. The latex was observed to be shelf stable in ambient laboratory conditions.

An aliquot of the latex was removed from the vessel after the neutralization and was subjected to $^{13}C$ NMR. The ratio of carboxamide:carboxylate content of the composition was determined to be about 70:30, which reflects the molar ratio of acrylamide:acrylic acid monomers added to the water phase.

Example 2

A water-in-oil latex including the materials shown in Table 2 was formed using the same procedure as outlined above for Example 1, except that no neutralization was conducted post-polymerization. Components of the latex are shown in Table 2.

TABLE 2

Components of a w/o latex polymerization of AM and AA.

| Composition | Material | Wt % |
|---|---|---|
| Oil Phase | KETRUL ® D80 (TOTAL Special Fluids of Casablanca, Morocco) | 25.72 |
| | Sorbitan monooleate | 0.31 |
| | POE (4) Sorbitan monostearate (polysorbate 61) | 1.24 |
| | Tween 61 | 0.67 |
| Water Phase | Acrylamide (50.24% in water) | 38.95 |
| | Acrylic Acid | 8.23 |
| | DI Water | 12.43 |
| | sodium chloride | 2.07 |
| | sodium hypophosphite | 0.002 |
| | Sodium hydroxide | 9.10 |
| | EDTA | 0.0092 |
| Initiators | Sodium metabisulfite | 0.018 |
| | tert-butyl hydroperoxide | 0.13 |
| Post-Polymerization Additive | Ammonium thiocyanate | 0.52 |

The resulting w/o latex was stable after cooling to ambient laboratory temperature and showed no sign of destabilization (separation, coagulum formation) during the procedure. The reduced specific viscosity (RSV) of the latex was 29.8 dL/g, as measured at 450 ppm polymer concentration in 1M sodium nitrate solution using an Ubbelohde semimicro dilution viscometer, size 75, held at 30° C.

Example 3

The compositions of Example 1 and Example 2 were subjected to ionic crosslinking conditions. Referring to Table 3, the indicated polymer latex was contacted with a 1 wt % NaCl solution having the indicated amount of aluminum citrate dissolved therein, to result in a dilute polymer solution having a polymer concentration as indicated in Table 3. Initial viscosity of the dilute solution was measured with an Anton-Paar MCR302 rheometer using double-gap concentric cylinder geometry held constant at 25° C. The viscosities reported were taken from an average of the viscosity data collected at 1 data point every 10 seconds, for 5 minutes. After the viscosity was characterized, the dilute solution was held at 50° C. for five (5) days in a convection oven before remeasuring viscosity. The results are shown in Table 3.

TABLE 3

Viscosity after contacting Ex. 1 and Ex. 2 polymers with aluminum citrate in 1 wt % NaCl.

| Sample | Polymer (ppm) | Al citrate (ppm) | t = 0 η, cP | t = 5 days/50° C. η, cP |
|---|---|---|---|---|
| Ex. 1 (Low pH Synthesis) | 600 | 15 | 8.8 | 14.2 |
| | 600 | 30 | 9.2 | 275 |
| | 1000 | 25 | 20.8 | 221 |
| | 1000 | 50 | 20.8 | 1014 |
| Ex. 2 (Neutral pH Synthesis) | 600 | 15 | 10 | 9.5 |
| | 600 | 30 | 9.8 | 9.4 |
| | 1000 | 25 | 21.2 | 20.5 |
| | 1000 | 50 | 21.5 | 21.0 |

Example 4

Example 4A: A commercially prepared hydrolyzed polyacrylamide homopolymer having a composition corresponding to about 70/30 wt/wt acrylamide/acrylic acid, delivered as 90 wt % dry powder (EOR360, obtained from TIORCO® of Denver, Colo.), was diluted to a target concentration of 600, 1000, or 1200 ppm polymer using a solution of either aluminum citrate (in 1 wt % NaCl) or chromium acetate (in 3 wt % NaCl) as indicated in Table 4. The dilute polymer solutions with crosslinkers were heated to 50° C. Viscosity was measured at t=0 (initial diluted viscosity) and after 5 days of stirring at 50° C. using an Anton-Paar MCR302 rheometer using double-gap concentric cylinder geometry held constant at 25° C. The viscosities reported were taken from an average of the viscosity data collected at 1 data point every 10 seconds for 5 minutes. Results are shown in Table 4.

Example 4B: A 70/30 w/w % acrylamide/acrylic acid copolymer was prepared according to the procedure of Example 2. The latex was diluted to a target concentration of 600, 1000, or 1200 ppm polymer using a solution of either aluminum citrate (in 1 wt % NaCl) or chromium acetate (in 3 wt % NaCl) as indicated in Table 4. The dilute polymer solutions with crosslinkers were heated to 50° C. Viscosity was measured at t=0 (initial diluted viscosity) and after 5 days of stirring at 50° C. using an Anton-Paar MCR302 rheometer using double-gap concentric cylinder geometry held constant at 25 C. The viscosities reported were taken from an average of the viscosity data collected at 10 l/s for 5 minutes (1 data point every 10 sec). Results are shown in Table 4.

Example 4C: A commercially prepared acrylamide/acrylic acid copolymer having a composition corresponding to about 70/30 wt/wt acrylamide/acrylic acid was delivered as 90 wt % dry powder (EOR380, obtained from TIORCO® of Denver, Colo.) and diluted to a target concentration of 600, 1000, or 1200 ppm polymer using a solution of either aluminum citrate (in 1 wt % NaCl) or chromium acetate (in 3 wt % NaCl) as indicated in Table 4. The dilute polymer solutions with crosslinkers were heated to 50° C. Viscosity was measured at t=0 (initial diluted viscosity) and after 5 days of stirring at 50° C. using an Anton-Paar MCR302 rheometer using double-gap concentric cylinder geometry held constant at 25 C. The viscosities reported were taken from an average of the viscosity data collected at 10 l/s for 5 minutes (1 data point every 10 sec). Results are shown in Table 4.

Example 4D: A 70/30 wt/wt acrylamide/acrylic acid copolymer was prepared according to the procedure of Example 1. The latex was diluted to a target concentration of 600, 1000, or 1200 ppm polymer using a solution of either aluminum citrate (in 1 wt % NaCl) or chromium acetate (in 3 wt % NaCl) as indicated in Table 4. The dilute polymer solutions with crosslinkers were heated to 50° C. Viscosity was measured at t=0 (initial diluted viscosity) and after 5 days of stirring at 50° C. using an Anton-Paar MCR302 rheometer using double-gap concentric cylinder geometry held constant at 25 C. The viscosities reported were taken from an average of the viscosity data collected at 10 l/s for 5 minutes (1 data point every 10 sec). Results are shown in Table 4.

Reduced specific viscosity (RSV) was also measured at $t_0$ for each of the polymers 4A-4D (uncrosslinked). The results are shown in Table 4.

TABLE 4

Viscosity at day 0 and day 5 for diluted solutions of the indicated polymer in the presence of the indicated crosslinker at the stated amount.

| Ex. No. | RSV (dL/g) | Polymer (ppm) | Crosslinker (Al or Cr) (ppm) | Al citrate in 1 wt % NaCl | | Cr acetate in 3 wt % NaCl | |
|---|---|---|---|---|---|---|---|
| | | | | $\eta$, t = 0 days (cP) | $\eta$, t = 5 days @ 50° C. (cP) | $\eta$, t = 0 days (cP) | $\eta$, t = 5 days @ 50° C. (cP) |
| 4A | 45 | 600 | 15 | 12.3 | 17.4 | 7.8 | 20.7 |
| | | 600 | 30 | 13.2 | 177 | 5.5 | 248 |
| | | 1000 | 25 | 24.4 | 48.8 | 18.8 | 24.5 |
| | | 1000 | 50 | 26.9 | 1144 | 19.3 | 67.4 |
| | | 1200 | 30 | 33.5 | 213 | 22.7 | 1141 |
| | | 1200 | 60 | 33.9 | 1470 | 22.7 | 1262 |
| 4B | 41 | 600 | 15 | 10.0 | 9.5 | 5.7 | 432 |
| | | 600 | 30 | 9.8 | 9.4 | 5.8 | 287 |
| | | 1000 | 25 | 21.2 | 20.5 | 12.0 | 647 |
| | | 1000 | 50 | 21.5 | 21.0 | 12.6 | 847 |
| | | 1200 | 30 | 28.1 | 27.1 | 16.9 | 854 |
| | | 1200 | 60 | 28.6 | 27.7 | 17.2 | 380 |
| 4C | 37 | 600 | 15 | 8.0 | 7.8 | 5.6 | 263 |
| | | 600 | 30 | 8.2 | 7.8 | 5.7 | 367 |
| | | 1000 | 25 | 16.3 | 15.8 | 10.6 | 472 |
| | | 1000 | 50 | 16.7 | 16.1 | 11.0 | 791 |
| | | 1200 | 30 | 21.4 | 20.8 | 14.1 | 915 |
| | | 1200 | 60 | 22.0 | 21.0 | 14.8 | 1047 |
| 4D | 37 | 600 | 15 | 8.8 | 14.2 | 5.5 | 324 |
| | | 600 | 30 | 9.2 | 275 | 5.5 | 180 |
| | | 1000 | 25 | 20.8 | 221 | 10.9 | 809 |
| | | 1000 | 50 | 20.8 | 1014 | 11.5 | 431 |
| | | 1200 | 30 | 28.3 | 373 | 15.4 | 294 |
| | | 1200 | 60 | 28.6 | 1527 | 15.6 | 1137 |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A composition comprising a water-in-oil latex, the water-in-oil latex comprising a water phase and an oil phase, the water phase comprising water and monomers, the monomers consisting of acrylamide and acrylic acid, wherein the pH of the water phase is about 3.0 to 4.5; wherein the latex further comprises a surfactant mixture consisting essentially of nonionic surfactants and comprising a block copolymer.

2. The composition of claim 1 wherein the ratio of acrylamide to acrylic acid is about 60:40 to 99:1.

3. The composition of claim 1 wherein the block copolymer is a triblock copolymer comprising at least one block consisting essentially of ethylene glycol repeat units and having an HLB of about 4 to 6.

4. The composition of claim 3 wherein the triblock copolymer further comprises at least one block consisting essentially of hydroxyacid repeat units.

5. The composition of claim 4 wherein the hydroxyacid is 12-hydroxystearic acid.

6. The composition of claim 1 wherein the pH is about 3.5 to 4.0.

7. A composition comprising a water-in-oil latex formed by a method comprising
   a. combining water and monomers to form a water phase, the monomers consisting of acrylamide and acrylic acid;
   b. adjusting the pH of the water phase to between about 3.0 to 4.5;
   c. combining a hydrocarbon solvent with a surfactant mixture to form an oil phase, the surfactant mixture consisting essentially of nonionic surfactants and comprising a block copolymer;
   d. contacting the water phase and the oil phase to form a water-in-oil latex;
   e. polymerizing the monomers to form a copolymer; and
   f. neutralizing the water phase.

8. The composition of claim 7 further comprising the product of diluting the composition with a water source after neutralizing, wherein the copolymer concentration after diluting is about 0.01 wt % to 1.00 wt %.

9. The composition of claim 8 wherein the water source comprises water and a salt of $Ca^{2+}$, $Fe^{+2}$, $Fe^{+3}$, $Mg^{2+}$, $Cr^{2+}$, $Cr^{3+}$, $Zn^{2+}$, or $Al^{3+}$.

10. The composition of claim 9 wherein the salt is aluminum citrate or chromium acetate.

11. The composition of claim 7 wherein the ratio of acrylamide to acrylic acid units in the copolymer is about 50:50 to 99:1.

12. The composition of claim 7 wherein the neutralizing comprises contacting the composition with sodium hydroxide and an alkanolamide surfactant.

13. The composition of claim 12 wherein the alkanolamide surfactant is N,N-diethanololeamide.

14. A method of making a water-in-oil copolymer latex, the method comprising
   a. combining water and monomers to form a water phase, the monomers consisting of acrylamide and acrylic acid;
   b. adjusting the pH of the water phase to between about 3.0 to 4.5;
   c. combining a hydrocarbon solvent with a surfactant mixture to form an oil phase, the surfactant mixture consisting essentially of nonionic surfactants and comprising a block copolymer;
   d. contacting the water phase and the oil phase to form a water-in-oil latex;
   e. polymerizing the monomers to form a copolymer; and
   f. neutralizing the water phase.

15. The method of claim 14 further comprising diluting the latex with a water source after neutralizing, wherein the copolymer concentration after diluting is about 0.01 wt % to 1.00 wt %.

16. The method of claim 15 wherein the water source comprises water and a salt of $Ca^{2+}$, $Mg^{2+}$, $Cr^{2+}$, $Cr^{3+}$, $Zn^{2+}$, or $Al^{3+}$.

17. The method of claim 16 wherein the salt is aluminum citrate or chromium acetate.

18. The method of claim 14 wherein the neutralizing comprises contacting the composition with a neutralizing solution, the neutralizing solution comprising sodium hydroxide and an alkanolamide surfactant.

19. A method of diluting a water-in-oil copolymer latex, the method comprising adding a water source to the water-in-oil copolymer latex of claim 14 after the neutralizing, wherein the water source comprises water and a salt of $Ca^{2+}$, $Mg^{2+}$, $Cr^{2+}$, $Cr^{3+}$, $Zn^{2+}$, or $Al^{3+}$; and the copolymer concentration after diluting is about 0.01 wt % to 1.00 wt %.

* * * * *